United States Patent [19]

Logan et al.

[11] Patent Number: 5,318,827
[45] Date of Patent: Jun. 7, 1994

[54] CARBONATE POLYMER LAMINATE STRUCTURE

[75] Inventors: Jane A. Logan, Angleton; Maurice J. Marks, Lake Jackson, both of Tex.

[73] Assignee: The Dow Chemical Company, Midland, Mich.

[21] Appl. No.: 898,978

[22] Filed: Jun. 15, 1992

[51] Int. Cl.⁵ .................... B32B 27/36; C08G 63/62
[52] U.S. Cl. .................................. 428/212; 428/218; 428/412; 428/910; 428/908.8; 428/2
[58] Field of Search ................ 428/412, 212, 218, 910

[56] References Cited

U.S. PATENT DOCUMENTS

| | | |
|---|---|---|
| 3,652,715 | 3/1972 | Holub et al. |
| 3,770,697 | 11/1973 | Holub et al. |
| 4,159,206 | 6/1992 | Armbruster et al. |
| 4,255,243 | 3/1981 | Coqueugniot et al. |
| 4,260,671 | 4/1981 | Merrill |
| 4,410,594 | 10/1983 | Olson |
| 4,435,450 | 3/1984 | Coleman |
| 4,708,994 | 11/1987 | Wong |
| 4,782,124 | 11/1988 | Hefner, Jr. et al. |
| 4,914,143 | 4/1990 | Patel |
| 4,943,619 | 7/1990 | Bell et al. |
| 5,037,903 | 7/1991 | Parker |
| 5,047,261 | 7/1991 | Moussa et al. |

FOREIGN PATENT DOCUMENTS

| | | |
|---|---|---|
| 0057897 | 2/1982 | European Pat. Off. |
| 0251357 | 5/1987 | European Pat. Off. |
| 63.7270641 | of 1988 | Japan |
| 01024809 | of 1989 | Japan |
| 01054058 | of 1989 | Japan |
| 01075521 | of 1989 | Japan |
| 9211308 | 7/1992 | PCT Int'l Appl. |
| 9211309 | 9/1992 | PCT Int'l Appl. |

*Primary Examiner*—P. C. Sluby

[57] ABSTRACT

According to the present invention there are obtained improved laminate structures comprising a substrate layer of a thermoplastic resin and a layer of crosslinked carbonate polymer on one or more surface areas. These structures have an excellent combination of properties, particularly in the areas of abrasion resistance, adhesion of the layers, weatherability (resistance to UV radiation, humidity, temperature), solvent resistance, hardness, impact strength, color, thermoformability, ignition resistance and recyclability of the article and scrap formed. In a preferred embodiment, the crosslinking in the crosslinked carbonate polymer layer is provided by crosslinking moieties, preferably arylcyclobutene moieties, which are terminally located relative to the precrosslinked carbonate polymer molecule chains. In general, the crosslinked carbonate polymer layer is required to have a sufficiently high degree of crosslinking and to have sufficiently stable crosslinks to provide the necessary abrasion resistance and other properties. The crosslink density of the crosslinked carbonate polymer layer should be such that the percent increase in the polymer Tg after crosslinking (%$\Delta$Tg) is greater than 17%.

11 Claims, No Drawings

CARBONATE POLYMER LAMINATE STRUCTURE

This invention relates to laminate structures comprising a thermoplastic core layer or section and a crosslinked carbonate polymer on one or more surfaces. These structures have an excellent combination of properties, particularly in the areas of abrasion resistance, adhesion of the layers, weatherability (resistance to UV radiation, humidity, temperature), solvent resistance, hardness, impact strength, color, thermoformability, ignition resistance and ability to recycle the articles and scrap formed.

Laminate or layered structures of various types are well known. Often times an abrasion resistant coating is employed at the surface to protect inner layers that are somewhat susceptible to abrasion but have other desirable traits. Typical examples of these prior art structures include structures based on one or more carbonate polymer core layers and having coatings composed of crosslinked polyacrylate or polysiloxane.

The polysiloxane compositions typically used for abrasion resistant coatings are thermoset organopolysiloxanes filled with colloidal silica particles. Examples of these coatings are disclosed in U.S. Pat. Nos. 4,159,206, 4,410,594, and 4,914,143.

In attempting to employ these types of compositions in abrasion resistant layers, particularly in carbonate polymer structures, primer layers are usually necessary to promote the adhesion of the polysiloxane coating. Typical primers include thermoset or thermoplastic acrylic polymers. While the polysiloxane coatings usually provide acceptable abrasion resistance, they suffer from a number of disadvantages including poor adhesion, insufficient weatherability, lack of thermoformability, and expensive lacquer coating application methods. It is also found that these surface layers and/or laminate structures oftentimes are not recyclable and the scrap from the production process or subsequent shaping steps cannot be reused. Another frequent disadvantage is that the solvents which are often employed in these lacquer coating formulations may not be environmentally acceptable.

It is also known that these existing coating materials for thermoplastic resins are often not able to be matched well to the substrate in terms of chemical compositions and modulus. By chemical composition matching is meant using a coating composition that is as compatible as possible with the substrate, the degree of compatibility being measured by the difference in solubility parameters of the compositions. Matching the modulus (stiffness) properties of the two compositions used for the structure layers is important to prevent cracking or delamination. When two adhered layers of different stiffness are flexed, there are significant stresses created at the boundary by their different performance under bending or flexing conditions.

In Bajpai, et al., "On the Microhardness of Irradiated Polycarbonate," Makromol. Chem., Macromol. Symp., 20/21 (Int. Symp. Polym. Mater., (1987), pages 461 through 464, it is disclosed that the Vickers hardness number of polycarbonates is increased by the crosslinking of the polycarbonate using gamma radiation doses on the order of 75 Megarads.

U.S. Pat. No. 4,943,619 discloses a polycarbonate-epoxy copolymer which is formed by reacting the epoxide groups of an epoxy resin with in-chain carbonate groups of a carbonate polymer in the presence of a catalyst. Through the reaction of diepoxides and polycarbonates, three dimensional crosslinked networks can be formed. This patent teaches that an abrasion resistant epoxy surface coating can be chemically bonded to a carbonate polymer substrate by coating the carbonate polymer with a layer of the catalyst, followed by coating with the layer of diepoxide resin. In this way, the crosslinked polycarbonate-epoxy copolymer is created as an adhesive at the boundary between the carbonate polymer and the epoxy resin surface layer.

In addition, there are a number of known crosslinked carbonate polymer compositions of a curable or thermoset nature based on epoxide, acrylic and other types crosslinking techniques which are generally suggested to be used as coatings. See for example U.S. Pat. Nos. 5,037,903; 4,255,243 and 5,047,261; and Japanese Patent Publications JP 63-270,641; JP 01-024,809; JP 01-075,521 and JP 01-054,058. However, due to deficiencies in one or more of the areas of: hardness, adhesion, optical properties and/or thermal stability properties, abrasion resistant layers for thermoplastic structures have not been able to be successfully prepared based on carbonate polymers. For example, in JP 01-054,058, silylized carbonate polymers are crosslinked using a zirconium catalyst. However, silicon and zirconium additives can cause complications in recycling, can cause reduced adhesion and optical properties in abrasion resistant layers for thermoplastics, as well as, introducing the zirconium metal which can cause molecular weight degradation in carbonate polymers.

It is an object of the present invention o provide a structure possessing a good combination of abrasion resistance and other physical properties. In particular, it is an object to provide structures based on one or more carbonate polymer core layers having an abrasion resistant carbonate polymer surface layer. It is a further object to provide an improved process for the production of such types of structures.

These and other objectives are achieved according to the present invention which is a laminate structure comprising a substrate layer of a thermoplastic resin and a distinct abrasion resistant layer of crosslinked carbonate polymer on one or more surface areas. As used herein, the term "surface abrasion resistant layer" means a layer having good combinations of abrasion resistance, hardness, adhesion, optical and thermal stability properties. In other embodiments, the crosslinked carbonate polymer on one or more surface areas has a crosslink density such that the measured %$\Delta T_g$ is greater than about 17% or such that the measured $v_p$ value is greater than about 0.65, %$\Delta T_g$ and $v_p$ being discussed below. In a preferred embodiment, the adhesion of the crosslinked carbonate polymer to the substrate thermoplastic resin layer as determined by ASTM D-3359, Method B, is 3B or better.

In another preferred embodiment, the present invention is a structure wherein the substrate layer thermoplastic resin is a thermoplastic aromatic carbonate polymer or a thermoplastic aromatic polyester carbonate. It is also preferred in the practice of the present invention to provide the crosslinking via crosslinking moieties terminally located relative to the precrosslinked carbonate polymer molecule chains, preferably wherein the precrosslinking degree of polymerization for the carbonate polymers used in preparing a crosslinkable carbonate polymer having terminally located crosslinking moieties is from 0 to about 3.5.

The laminate structures of this invention are found to have an excellent combination of properties, particularly in the areas of abrasion resistance, adhesion of the layers, weatherability (resistance to UV radiation, humidity, temperature), solvent resistance, hardness, impact strength, color, thermoformability, ignition resistance and recyclability of the article and scrap formed.

In one further aspect the present invention is a process for preparing a laminate structure comprising a substrate layer of a thermoplastic resin and a layer of crosslinked carbonate polymer on one or more surface areas comprising the application of a surface layer of thermally crosslinkable carbonate polymer to the substrate and heat activating the crosslinking. Preferably, the process comprises thermoforming the laminate to a desired shape prior to or at the same time as heat activating the crosslinking. Preferably the crosslinking is completed by heat activation.

In general, the structures according to the present invention have one or more substrate or core layers to which are laminated or adhered the crosslinked carbonate polymer surface layer. The core layers can be prepared from a variety of different thermoplastic resin types selected from the group of thermoplastic aromatic carbonate polymers; thermoplastic aromatic polyester carbonates; thermoplastic aromatic polyesters; thermoplastic aliphatic-aromatic polyesters of iso- and/or terephthalic acid; polyvinyl chloride; polyvinylidene chloride; thermoplastic polymers of styrene and/or other monovinylidene aromatic monomers, including their copolymers with maleic anhydride, (meth)acrylates, (meth)acrylonitrile and including rubber modified versions of any of these; thermoplastic poly-alpha-olefins such as polyethylene and polypropylene; thermoplastic poly(meth)acrylates which may be modified if necessary; thermoplastic blends of polystyrene with polyphenylene ether; and blends consisting of any combination of the above-mentioned thermoplastics. The preferred materials for use in at least one, preferably all core layers if there are more than one, are the thermoplastic aromatic carbonate polymers.

Such thermoplastic carbonate polymers suitable for use in the substrate or core layers this invention are well known in the literature and can be prepared by known techniques. In general the carbonate polymers can be prepared from one or more multihydric compounds by reacting the multihydric compounds such as a diphenol, with a carbonate precursor such as phosgene, a haloformate or a carbonate ester such as diphenyl or dimethyl carbonate. Preferred diphenols are 2,2-bis(4-hydroxyphenyl)-propane (i.e., bisphenol-A) and phenol, 4,4'-(9-H-fluorene-9-ylidene)bis (i.e., bishydroxyphenylfluorene).

The carbonate polymers can be prepared from these raw materials by any of several known processes such as the known interfacial, solution or melt processes. As is well known, suitable chain terminators and/or branching agents can be employed to obtain the desired molecular weights and branching degrees.

It is understood, of course, that an aromatic carbonate polymer may be derived from (1) two or more different dihydric phenols or (2) a dihydric phenol and a glycol or a hydroxy- or acid-terminated polyester or a dibasic acid in the event a carbonate copolymer or heteropolymer rather than a homopolymer is desired. Also suitable for the practice of this invention are blends of any one of the above carbonate polymers.

Also included in the term aromatic carbonate polymer are the aromatic ester/carbonate copolymers.

Except with regard to their molecular weight range which will be discussed below, the carbonate polymers suitable for use in the crosslinked surface layer(s) of the claimed invention can be of the same type as those used in the substrate of core layers. The surface layer carbonate polymers are most preferably aromatic carbonate polymers which provide better combinations of physical properties such as heat resistance.

Critical to the practice of this invention is the use of a surface layer of crosslinked carbonate polymer where the carbonate polymer has the specified crosslink density. Carbonate polymers are generally known to have somewhat poor abrasion resistance and it has been found that a minimum crosslink density in the carbonate polymer is required to achieve the desired abrasion resistance performance.

Crosslinked carbonate polymers suitable for use according to the present invention can be prepared by several approaches, as described by H. Schnell in "Chemistry and Physics of Polycarbonates", for instance by exposure of carbonate polymer to ionizing radiation, by reaction of carbonate polymer with crosslinking agents, and by reaction of crosslinking groups bound to the carbonate polymer chain. It should be noted that certain crosslinking techniques can, however, actually lead to degradation, unacceptable coloration and/or inferior properties in the crosslinked carbonate polymer and would need to be used appropriately and/or carefully monitored.

It is also noted that some crosslinking moieties are not sufficiently stable to withstand the processing conditions or application environments that the structures according to this invention may be exposed to. The instability of the crosslink can be determined if the crosslinked polymer properties are 41 degraded and/or there is loss in crosslink density over time or subsequent to later processing steps such as heating. Preferably the crosslinking moieties are sufficiently stable, such that after the crosslinking step and necessary processing steps, such as heating to the melt processing temperature of the substrate thermoplastic and/or crosslinked carbonate polymer, the crosslinked polymer will retain its properties and crosslink density as determined by one more of the methods mentioned below.

Also preferred are crosslinking techniques which are performed or crosslinking moieties which are activated without the use of supplemental chemicals or additives that can be hazardous, and/or produce unwanted by-products or side reactions.

It has been found that crosslinking or crosslinking moieties that are terminally located on carbonate polymer molecule chains provide very effective materials for use in the surface layer of these structures. Among other reasons, it has been observed that such carbonate polymers can be very effectively and reproducibly produced by the use, in the carbonate polymer polymerization process, of chain terminating molecules containing crosslinking moieties or containing moieties which can be preferentially functionalized to result in crosslinking moieties or sites. As compared to the use of crosslinking additives or crosslinking techniques that randomly locate the crosslinks pendantly throughout the polymer chain, terminal crosslinks are found to provide more consistent and controllable crosslinking of carbonate polymers and provide preferred compositions for use in the present invention.

In view of the disclosure of the present invention, the skilled artisan will be able to select and employ appropriate crosslinking techniques to provide the desired amount (density) of crosslinks at a sufficient rate under the selected crosslinking conditions and result in crosslinks that remain stable under the conditions in which the resulting article is subsequently processed and employed. Among the specific crosslinking techniques which can be employed are exposure to ionizing radiation, addition of crosslinking agents, and reaction of bound crosslinkable moieties.

It has been found that arylcyclobutene groups provide very effective crosslinking in carbonate polymers, particularly aromatic carbonate polymers, due to the relationship of the temperatures for aromatic carbonate polymer processing and crosslink activation and due to the stability of the arylcyclobutene crosslink in typical aromatic carbonate polymer application conditions. The aromatic arylcyclobutene groups prove to be very compatible with aromatic carbonate polymers and also provide very desirable aromatic carbonate polymers when a monofunctional condensation reactive arylcyclobutene compound is reacted with a carbonate precursor such as phosgene.

Techniques for preparing arylcyclobutene-containing molecules, including aromatic carbonate polymers, are known in the literature. See for example U.S. Pat. No. 4,708,994 to Wong and U.S. Pat. Nos. 5,198,527 and 5,171,824 to Marks et al, which applications of Marks et al are commonly assigned herewith; all of which are incorporated by reference herein. As shown in U.S. Pat. No. 4,708,994, arylcyclobutene moieties can be incorporated via molecules with aromatic-reactive moieties which attach randomly all along a aromatic carbonate polymer molecule chain. In this way the arylcyclobutene moieties become pendant from the polymer backbone with a somewhat irregular and inconsistent distribution along the polymer.

A preferred technique for arylcyclobutene functionalization and a preferred class of crosslinked aromatic carbonate polymers are shown in the applications of Marks et al. where the backbone chains of all or part of the aromatic carbonate polymer molecules are provided with terminal arylcyclobutene moieties. In some situations it may be desirable to avoid arylcyclobutene moieties which are pendant from the polymer backbone to the extent that their irregular and inconsistent distribution along the polymer molecules detrimentally affects the polymer properties, such as by causing gels or reduced physical properties. Preferably the arylcyclobutene moieties in carbonate polymers according to the present invention consist essentially of terminal arylcyclobutene moieties and more preferably there are essentially no pendant arylcyclobutene moieties.

In general an arylcyclobutene terminated carbonate polymer corresponds to the formula below:

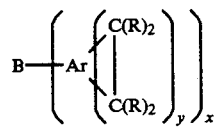

wherein B is a carbonate polymer, Ar is an aromatic radical which may be substituted with an electron-withdrawing substituent or electron-donating substituent, the carbon atoms represented by C are bonded to adjacent carbon atoms of the aromatic radical Ar, R is independently in each occurrence hydrogen or an electron-withdrawing substituent or electron-donating substituent; x is an integer of 1 or greater, and y is an integer of 1 or greater, preferably 1. For example, a benzocyclobutene-functionalized carbonate according to the present invention corresponds to the following formula:

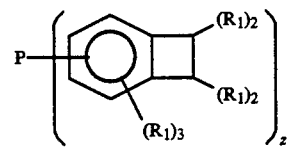

wherein P is a carbonate, $R_1$ is independently in each occurrence hydrogen or an electron-withdrawing substituent or electron-donating substituent; z is an integer of 1 or greater. Benzocyclobutene, represented by this formula where there is no pendant carbonate polymer and $R_1$ is always hydrogen, is also referred to as bicyclo[4.2.0]-octa-1,3,5-triene.

Providing the backbone chains of all or part of the carbonate polymer molecules with terminal arylcyclobutene moieties can be accomplished by a number of techniques including the use of an arylcyclobutene-functionalized chain terminating compound in a carbonate polymer polymerization reaction or the use of a suitably functionalized arylcyclobutene compound to react with terminally located reactive moieties on an existing carbonate polymer. Compounds suitable for use as chain terminating compounds in carbonate polymerization processes are well known in the literature. Similarly, techniques for preparing arylcyclobutene-containing molecules are well known in the literature, for example U.S. Pat. Nos. 4,540,763 and 4,708,994; both of which are incorporated by reference herein.

The terminal arylcyclobutene moieties are effectively and efficiently incorporated into the carbonate polymers according to the present invention by the use of arylcyclobutene-functionalized chain terminating compounds. In such compounds the arylcyclobutene moieties are located on molecules which react into but terminate the growing carbonate polymer molecules. For example, arylcyclobutene-containing molecules with a single acyl chloride or hydroxy functionality are desirably employed in the carbonate polymer polymerization process.

For example, in U.S. Pat. No. 4,540,763 acid chloride functionalized and hydroxy functionalized arylcyclobutene compounds are described. See also Lloyd et al., *Tetrahedron*, vol. 21, pp. 2281–2288, (1965) where hydroxybenzocyclobutene is shown. Hydroxybenzocyclobutene, and particularly 4-hydroxybenzocyclobutene, is a preferable arylcyclobutene-functionalized chain terminating compound for use in preparing the carbonate polymers according to the present invention. 4-Hydroxybenzocyclobutene is also referred to as 3-hydroxybicyclo[4.2.0]-octa-1,3,5-triene. The hydroxy moiety in hydroxybenzocyclobutene reacts very effectively in the carbonate polymerization process to provide the desired levels of terminal benzocyclobutene moiety.

By controlling the overall and relative amounts of the arylcyclobutene chain terminating compound and any other carbonate polymer terminating compounds employed, the concentration of the arylcyclobutene groups and the molecular weight of the carbonate polymer can be optimized for a particular set of properties. In this way, the total concentration of terminating compound(s) statistically determines the chain length of the carbonate polymer molecules as indicated below where the the Flory equations for this calculation are reproduced.

As mentioned above, the molecular weight (degree of polymerization) of the carbonate polymers to be used in the crosslinked layer, prior to crosslinking, is not necessarily in the same range as the molecular weight range for the carbonate polymers that can be used in the substrate layer(s) of the claimed structures. As is known, the initial degree of polymerization of carbonate polymer, prior to crosslinking can be calculated by the Flory equation described in P. J. Flory, "Principles of Polymer Chemistry", Cornell Univ. Press, Ithaca, New York, p. 92 (1953). For carbonate condensation polymers these degrees of polymerization can be calculated and obtained in accordance with these well known Flory equations, as reproduced below:

$$n = (1+r)/(1+r-2pr) \quad r = X_d/(X_d + 2X_t)$$

where n is the average degree of polymerization, r is the mole ratio of reactive groups, p is the extent of reaction, $X_d$ is the mole fraction of the dihydric chain extending compound and $X_t$ is the mole fraction of the monohydric chain terminating compound.

In general, the precrosslinking degree of polymerization for the crosslinked carbonate polymers used in the surface layers according to this invention can vary across a relatively broad range. Particularly when using terminal crosslinking groups, very short chain carbonates or monocarbonates can be used. Very short chain carbonates, which are not actually "polymers" prior to crosslinking, are obtained, for example, when carbonate polymer precursors such as phosgene or dimethyl or diphenyl carbonate are reacted with or terminated with at least one condensation reactive compound that provides at least one crosslinkable location. For example, a short chain carbonate of this type is prepared when one mole of phosgene is reacted with at least 1, preferable 2 moles of 4-hydroxybenzocyclobutene, also referred to as 3-hydroxy-bicyclo[4.2.0]-octa-1 3,5-triene. Technically, these carbonates, prior to crosslinking, would have a degree of polymerization of zero. It has been determined that the precrosslinking average degree of polymerization for terminal crosslinkable carbonate polymers used in the surface layers according to this invention can be a low as 0 where a monocarbonate is used and can range up to about 3.5, preferably less than or equal to about 3.

Regarding the crosslinked carbonate polymers, there has been found to be a critical amount of crosslinking necessary to obtain the desirable property combinations according to the present invention, particularly the abrasion resistance. Many physical and chemical properties of crosslinked network polymers are generally known to be affected by their crosslink density, which is the chain length or molecular weight of polymer between crosslink junctions. In general, the crosslink density of a network polymer depends on the molecular weight of the uncrosslinked precursor(s), the functionality of the network junction, the degree of conversion of the crosslinking reaction, and the position of the crosslink site(s) with respect to the precursor molecule(s).

Quantification of each of these parameters and the determination of actual crosslink density is often difficult owing to the complex nature and insolubility of network polymers which usually precludes the use of direct analytical techniques. Several indirect methods to estimate crosslink density have been developed, for example solvent swelling and glass transition temperature (Tg). Techniques such as these and the theory behind them are discussed in "Rubberlike Elasticity: A Molecular Primer" by J. Mark and B. Erman.

For crosslinked carbonate polymers prepared by crosslinking of terminally functionalized compounds, such as arylcyclobutene-functionalized aromatic carbonate polymers, the actual crosslink density can be calculated directly and solely from the degree of polymerization (n) of the precursor carbonate polymers and the functionality of the network arylcyclobutene junction. As reported in M. J. Marks, "Network Structure of Benzocyclobutene Terminated Bisphenol A Polycarbonates," Amer. Chem. Soc. Polym. Mat. Sci. Eng. 66, 1992, 365 and in M. J. Marks, "Products and Mechanism of Benzocyclobutene Homopolymerization", Amer. Chem. Soc. Polym. Mat. Sci. Eng. 66, 1992, p. 322), the network junction functionality of arylcyclobutene-functionalized carbonate polymers is estimated to be 2.5. This means that there are, on the average, 2.5 carbonate polymer molecules involved or linked into the crosslink junction.

Thus, it can be seen that the crosslink density expressed in terms of the number of monomer repeat units (Nc) of arylcyclobutene-functionalized carbonate polymers is approximately equal to the initial average degree of polymerization (n), which can be calculated by the Flory equation as described above, multiplied by 1.5:

$$Nc = 1.5\,n$$

assuming nearly complete arylcyclobutene conversion. The multiplier 1.5 reflects the fact that with an average of 2.5 polymer molecules joining at each arylcyclobutene crosslink site, half of the sites create a linear chain extension and only half of the sites create an actual crosslink.

Analogously, the molecular weight between crosslinks (Mc) is equal to the initial number average molecular weight (Mn) of the precursor multiplied by 1.5:

$$Mc = 1.5\,Mn$$

again, assuming nearly complete arylcyclobutene conversion.

Thus, the crosslink densities of benzocyclobutene terminated linear, bisphenol A polycarbonates (BCB polycarbonates), will be either: (a) 1.5 times the degree of polymerization (n) to determine the average number of monomer units between crosslinks (Nc) or (b) 1.5 times the actual number average (Mn) to determine the average amount of polymer molecular weight between crosslinks (Mc) in the crosslinked polymer. After crosslinking the other indirect techniques can be employed to characterize the networks formed and the data obtained by those techniques calibrated to actual crosslink densities using the BCB polycarbonates data.

In the practice of the present invention, it is desired to provide a crosslink density in the crosslinked carbonate polymers in the surface layer(s) such that the abrasion resistance of the polymer is improved. Generally, for the crosslinked carbonate polymers which have terminal crosslinking sites and the actual crosslink density can be determined by calculation or direct techniques, the carbonate polymer crosslink densities are less than about 5, preferably less than about 4.5, more preferably less than about 4 and most preferably less than about 3.5 (the smaller numbers indicating shorter distances between crosslinks and thus higher crosslink densities).

Unfortunately, the degree of polymerization (n) and the crosslinking density ($N_c$ or $M_c$) of many crosslinked polymers cannot be readily determined by the direct method used for BCB polycarbonates. Indirect measures of crosslink density must then be used, such as determination of the volume fraction of polymer in a solvent swollen network, $v_p$, and the percentage increase in the glass transition temperature (Tg) of the crosslinked polymer over the structurally analogous linear, high molecular weight polymer. For example, increase in the glass transition temperature (%ΔTg) indicates the crosslink density and is determined as follows:

%ΔTg=[Tg(crosslinked carbonate polymer)-Tg(linear carbonate polymer)]/Tg(linear carbonate polymer)×100.

The Tg values to use for calculation of the %ΔTg can be determined by those skilled in the art, preferably by differential scanning calorimetry. It has been found that the %ΔTg required to achieve the crosslink density of the crosslinked carbonate polymer of this invention is greater than about 17%, preferably greater than about 20% and more preferably greater than about 23%.

As mentioned, the volume fraction of polymer in a solvent swollen network, $v_p$, is also an indirect measure of the crosslink density of a crosslinked polymer. The technique for determination of $v_p$ and the theory are known to those skilled in the art and are discussed in "Rubberlike Elasticity: A Molecular Primer" by J. Mark and B. Erman. In general, the procedure involves immersing a sample of crosslinked polymer of known volume in a solvent. After allowing the polymer to swell and form a gel of polymer and solvent and determining the increased volume, $v_p$, is calculated as the volume fraction of polymer in the gel based on total gel volume. For BCB polycarbonates, $v_p$ was determined in dichloromethane. It has generally been found that the appropriate crosslink densities for the crosslinked carbonate polymers for use according to this invention are reflected by $v_p$ values greater than about 0.65, preferably greater than about 0.7, more preferably greater than about 0.75 and most preferably greater than about 0.8.

Preferably, for the structures according to the invention, the crosslinked carbonate polymer layer has generally good thermal stability as determined by thermogravimetric analysis (TGA). This test can be used to determine the decomposition temperature ("Td") of the polymer, the temperature at which 5% of the sample material is lost with heating up to 700° C. in nitrogen, increasing the temperature by 10° C. per minute. Preferably, the crosslinked carbonate polymers for use according to this invention have Td's greater than 350° C., more preferably greater than 375° C., most preferably greater than 400° C.

Preferably, for the structures according to the invention, the adhesion of the crosslinked carbonate polymer on the surface area of the substrate thermoplastic resin layer as determined by ASTM D-3359, Method B is rated as 3B or better, more preferably 4B or better, most preferably 5B. Most preferably, these levels of adhesion are maintained even after exposure to harsh environments such as a humidity oven or 65 degree Celsius water bath or an accelerated weathering test, such as ASTM D-2565 using a Xenon Arc Weather-Ometer (TM of Atlas Electric Devices Co.). It is preferred for purposes of economics and recycling of the structures or their resulting scrap that the adhesion of the layer be obtained without a primer layer, especially when a crosslinked carbonate polymer layer is being employed with a carbonate polymer substrate. Oftentimes primer layers are required to successfully adhere the previously known abrasion resistance coatings onto certain substrates such as carbonate polymers.

Preferably, where transparent structures according to the invention are desired, the optical properties of the surface crosslinked carbonate polymer layer need to be as good as possible. For most such applications it is desired to have a surface crosslinked carbonate polymer layer which have haze values as determined by a HunterLab ColorQuest Spectrocolorimeter of less than about 20% and light transmittance values as determined by a HunterLab ColorQuest Spectrocolorimeter of greater than about 80%. Most preferably, these optical properties are maintained even after exposure to harsh environments or an accelerated weathering test, such as ASTM D-2565.

In connection with the optical properties and also the ability to recycle structures according to the invention, it has been found to be advantageous to employ crosslinked carbonate polymers that contain little or no trace or impurity amounts of any metal compounds, such as can be incorporated with the use of crosslinking catalysts. Such catalysts include compounds containing, for example, copper, tin or zirconium. In general, it is desired to maintain the levels of these and other metals below 100 parts per million (PPM), more preferably below 10 PPM and most preferably below 1 PPM in the final structure. More advantageously, it is desired to maintain the levels of metals below 1,000 PPM, more preferably below 100 PPM and most preferably below 10 PPM in the crosslinked carbonate polymer layer(s). Levels higher than this can result in poor optical properties of the carbonate polymer resin and in unacceptable degradation of the resin if it attempted to be further heat plastified or recycled.

The crosslinked or crosslinkable carbonate polymers can be applied onto a substrate to prepare the structures according to the present invention by a variety of known polymer processing techniques for preparing laminated structures. Included among these conventional application techniques are compression molding, coextrusion, dipping, spraying or roll-coating. The material can also be finely ground and applied as a powder coating. The coating thickness can be varied by means of the particular application technique. In general coating thicknesses should be at least about 0.001 millimeter (mm), preferably at least about 0.003 mm and more preferably at least about 0.005 mm. The maximum thickness of the coatings is determined primarily by coating technique and economic factors and is not as important as obtaining the minimum thickness. Generally, the layers can range in thickness up to about 5 millimeters (mm) in thickness, preferably up to about 1 mm, more preferably up to about 0.5 mm, more preferably up to about 0.25 mm, and most preferably up to about 0.1 mm.

In one aspect the present invention is an improved process for preparing laminate structures involving the application of a distinct surface layer of a crosslinked or crosslinkable, preferably thermally crosslinkable, carbonate polymer to a thermoplastic substrate, preferably an aromatic carbonate polymer. One advantage of the use of the crosslinked layers of carbonate polymers is that the structure having the layer already incorporated can still be further shaped, such as by thermoforming. Unlike the previously known abrasion resistance layers, the crosslinked carbonate polymers, and particularly the crosslinkable carbonate polymers, have surprisingly been found to provide improved combinations of thermoformability and abrasion resistance.

Where the carbonate polymer is in crosslinkable form, application of the layer can preferably be done prior to complete crosslinking of the carbonate polymer and the crosslinking subsequently completed following or during any necessary forming or shaping steps such as thermoforming. Depending on the exact crosslinking mechanism of a crosslinkable carbonate polymer, heating or other steps involved in its preparation and/or application to the substrate may initiate some amounts of crosslinking. However, prior to completion of the crosslinking, these uncrosslinked or only partially crosslinked materials are still referred to as crosslinkable where less than 75%, preferably less than 50% of the crosslinking is completed.

The preferred crosslinkable carbonate polymers are also characterized by their ability to be further melt processed and/or thermoformed at standard, carbonate polymer melt processing conditions, preferably being melt processable in the range of from about 150° C. to about 400° C., preferably from about 200° C. to about 350° C. A preferred process for preparing a laminate structure comprises the step of thermoforming the laminate to a desired shape prior to or at the same time as completing of the crosslinking. Preferably the crosslinking is completed by heat activation.

It should also be noted that the standard additives can be included in the resin formulations used to prepare the inner and crosslinked carbonate polymer surface layer(s). Such additives include fire retardant additives, antistatic agents, fillers (i.e. glass fibers), pigments, dyes, antioxidants, heat stabilizers, ultraviolet light absorbers, mold release agents, impact modifiers and other additives commonly employed in carbonate polymer compositions.

The following Experiments are given to further illustrate the invention and should not be construed as limiting its scope. In the following Experiments, all parts and percentages are by weight unless otherwise indicated.

According to the following procedure, carbonate polymers were prepared with the indicated levels of 4-hydroxy benzocyclobutene (BCB-OH) per mole of bisphenol-A ("m/m"). The composition of Experiment No. 6 was prepared similarly with the exception that no bisphenol-A was used and the BCB-OH was reacted directly onto phosgene. Since there was no bisphenol-A, the BCB mole ratio with bisphenol-A was infinity.

Experiments—Preparation of BCB PC

A glass reactor was fitted with a mechanical stirrer, a baffle, a thermometer, a pH electrode connected to a pH meter/controller, a liquid inlet tube, a gas inlet tube and a gas outlet tube connected to a phosgene scrubber, the scrubber containing an aqueous solution of 50 weight percent sodium hydroxide and about 1 percent by weight triethylamine. To the reactor was added 68.5 weight parts (0.3 mole parts) bisphenol A, 28.8 weight parts (0.24 mole parts) 4-hydroxybenzocyclobutene (BCB-OH), 500 weight parts water and about 250 weight parts dichloromethane.

While stirring the reaction mixture there were added 67.2 weight parts (0.84 mole parts) of sodium hydroxide in a 50 weight percent aqueous solution followed by the addition of 67 weight parts (0.678 mole parts) of gaseous phosgene at a rate of about 1 weight part per minute. The sodium hydroxide addition was maintained as needed to maintain a pH of about 12.5. Following the phosgene addition, 560 weight parts dichloromethane and 0.3 weight parts (1 mole percent) triethylamine were added. The reaction mixture was agitated for 20 minutes to produce a bisphenol A polycarbonate resin terminated with benzocyclobutene moieties. The pH of the mixture was reduced to about 7 by the addition of 9 weight parts of phosgene. The polymer solution was washed with 1N HCl and with water and the polymer was then isolated.

The polymer molecular weight was determined by gel permeation chromatographic analysis, the weight average molecular weight (Mw) being 1,451. Liquid chromatographic analysis of the reaction mixture residue showed complete reaction of the 4-hydroxybenzocyclobutene. The resulting polycarbonate, before any crosslinking, was therefore determined to contain 0.8 moles benzocyclobutene per mole bisphenol A (0.8 m/m) and have a degree of polymerization of about 2.3.

Using the process as described above and adjusting the amounts of aqueous sodium hydroxide, water, phosgene and methylene chloride, a series of arylcyclobutene terminated aromatic carbonate polymers having a range of molecular weights and arylcyclobutene concentrations were prepared as shown in Table I. In Table I the ratio of the moles hydroxybenzocyclobutene to the moles of bisphenol A is shown as "BCB Mole Ratio." As shown in Table I, varying the amounts of BCB-OH results in the indicated range of polymer compositions and molecular weights. The table shows the correlation between the molecular weight of the resulting polymer (Mw and Mn), the degree of polymerization (n) and the mole ratio of arylcyclobutene to multihydric compound.

Table I then shows the very desirable property combinations in the resulting crosslinked polymer compositions. Regarding the test results shown in the Tables below, the molecular weights Mw and Mn were measured by gel permeation chromatography according to a bis phenol-A polycarbonate standard. The Tg values were measured by Differential Scanning Calorimetry. The percent swelling (% Swell) and $v_p$ values show the crosslink density as the resistance to solvent swelling of the polymer. According to the technique described in M. J. Marks, "Network Structure of Benzocyclobutene Terminated Bisphenol A Polycarbonates," Amer. Chem. Soc. Polym. Mat. Sci. Eng. 66, 1992, 365 these were measured on approximately 0.254 mm (1/100 inch) film samples soaked in dichloromethane. All of the crosslinked polycarbonate samples were found to be insoluble in dichloromethane. The indicated % Swelling results are the percentage increase in the polymer surface area due to solvent absorption.

The thermal stability of the crosslinked carbonate polymers were measured by thermogravimetric analysis (TGA), the Table reporting the decomposition temperature ("Td"), the temperature at which 5% of the sample material is lost with heating up to 700° C. in nitrogen, increasing the temperature by 10° C. per minute. The Pencil hardness testing approximates the abrasion resistance of the samples and is tested according to ASTM D-3363 with H being the hardest and F, HB, B, 2B and 3B indicating progressively less hardness. As shown, a typical carbonate polymer has a hardness value of about HB and a hardness value of B is recognized to be significantly better hardness than standard carbonate polymers.

Samples of the crosslinked polymer were also tested for abrasion resistance (shown by delta % haze in the Tables) using the Taber abrasion test, ASTM D1044-85. The test panels were cut into 102 mm by 102 mm (4 inch by 4 inch) dimensions, and a 6.4 mm (¼ inch) hole was drilled into the center of each panel. The Taber Abraser was equipped with CS-10F wheels. A 500 gram load was placed on each CS-10F wheel. The initial % haze was measured at four places along the future wear track on each sample using a Hunter Lab Colorquest Spectrophotometer. The sample was abraded in 100 cycle increments, and the % haze was remeasured in the same four places. The four differences in % haze were calculated and averaged to give the delta % haze. The test duration was 500 cycles. As shown in Table I, a very high crosslink density BCB Polycarbonate, formed from a very low dp precursor, is needed to give a suitably low increase in % haze after abrasion. As can be seen the transition from a relatively poor abrasion resistant polymer to a good one is quite abrupt.

accomplish crosslinking the BCB moieties. This procedure developed the full crosslink density of the coating materials.

The coated plaque samples were then tested for abrasion resistance (shown by delta % haze in the Table) using the Taber abrasion test, ASTM D1044-85 as described above. Samples were also tested for adhesion of the crosslinked carbonate polymer on the surface area of the substrate thermoplastic resin layer as determined by ASTM D-3359, Method B. In this test, the best result obtainable is a rating of 5B, with ratings of 4B and 3B indicating progressively poorer adhesion.

The indicated structures according to the present invention were compared to a sheet with no coating prepared from LEXAN brand polycarbonate sheet, and to a LEXAN MARGARD brand sheet, a commercially available abrasion resistant polycarbonate sheet with a polysiloxane coating and an acrylic primer. The results of the abrasion tests are shown below.

TABLE II

| Abrasion Resistance of Coated PC Plaques | | |
|---|---|---|
| Sample | Delta % Haze at 500 Cycles | Adhesion |
| 0.8 m/m BCB PC Coating - Expt. 3 | 9 | 5B |
| 2.0 m/m BCB PC Coating - Expt. 5 | 6 | 5B |
| LEXAN | 33 | |
| LEXAN MARGARD | 9 | 5B |

TABLE I

| | Composition and Property Data | | | | | | |
|---|---|---|---|---|---|---|---|
| Experiment No. | PC Control | 1 | 2 | 3 | 4 | 5 | 6 |
| BCB Mole Ratio | 0 | 0.3 | 0.4 | 0.8 | 1 | 2.0 | Mono carbonate |
| BCB—OH | | | | | | | |
| Moles | 0 | 0.09 | 0.09 | 0.24 | 0.30 | 0.20 | 0.17 |
| Weight parts | 0 | 10.8 | 10.6 | 28.8 | 37.5 | 24.0 | 20.0 |
| Bis-Phenol A | | | | | | | |
| Moles | — | 0.30 | 0.22 | 0.30 | 0.30 | 0.10 | 0 |
| Weight parts | — | 68.5 | 50.2 | 68.5 | 68.5 | 22.8 | 0 |
| Mw | 30000 | 4128 | 3105 | 1451 | 1327 | 639 | 266* |
| Mn | 12000 | 1408 | 927 | 578 | 500 | 266 | 266* |
| Mw/Mn | 2.50 | 2.93 | 3.35 | 2.80 | 2.65 | 2.40 | 1.0 |
| Metal Content | less 10 PPM | less 10 PPM | less 10 PPM | less 10 PPM | less 10 PPM | less 10 PPM | less 10 PPM |
| n (degree of polymer'n) | 34 | 4.3 | 3.5 | 2.3 | 2 | 1.0 | 0 |
| Tg (C) | 155 | 181 | 180 | 198 | 207 | 238 | 265 |
| delta Tg % | 0 | 17 | 16 | 28 | 34 | 54 | 71 |
| % Swell CH2CL2 | soluble | 33 | 39 | 13 | 18 | | |
| $v_p$ | 0 | 0.65 | 0.61 | 0.83 | 0.78 | | |
| Pencil Hardness | HB | F | F | H | H | H | |
| Td (C) | 475 | | | | 415 | | |
| % Transmittance | 92.0 | 90.6 | 90.4 | 88.7 | 86.7 | | |
| % Haze | 2.8 | 9.5 | 8.4 | 13.3 | 7.6 | | |
| delta % Haze | 32.8 | 29 | 29 | 10 | | 8 | |

*Calculated based on molecular formula

Preparation of Laminate Structures

The benzocyclobutene terminated polycarbonates which had been prepared as described above were compression molded to form layers of about 4 mils (0.10 mm) thick on plaques of polycarbonate ⅛ inch (3.2 mm) thick. The polycarbonate in the plaques had a melt flow rate of 3.4 grams per 10 minutes as measured according to ASTM D-1238, condition "O". The BCB polycarbonate samples were melted in an oven at 220° C. under a nitrogen purge to remove any air bubbles from the material. The material was then poured onto the polycarbonate plaques which were placed in a 4.0 mil (0.10 mm) thick mold and compression molded for 30 minutes at 200° C., melting the coating, followed heating to 291° C. and holding at that temperature for 1 minute to As shown in the table above, the 2.0 m/m BCB Polycarbonate coated sample showed more abrasion resistance than either the polycarbonate coated with 0.8 m/m BCB polycarbonate or the LEXAN MARGARD.

What is claimed is:

1. A laminate structure comprising (a) a substrate layer prepared from a thermoplastic resin to which is laminated (b) a distinct abrasion resistant surface layer of crosslinked aromatic carbonate polymer on at least one surface area.

2. A structure according to claim 1 wherein the crosslinked aromatic carbonate polymer on at least one surface area has a crosslink density such that the measured % ΔTg is greater than about 17%.

3. A structure according to claim 1 wherein the crosslinked aromatic carbonate polymer on at least one surface area has a crosslink density such that the measured $v^p$ is greater than about 0.65.

4. A structure according to claim 1 wherein the adhesion of the crosslinked aromatic carbonate polymer to the substrate thermoplastic resin layer is sufficiently strong such that the structure, when tested for adhesion by ASTM D-3359, Method B achieves the adhesion level of 3B or is more adherent.

5. A structure according to claim 1 wherein the crosslinked aromatic carbonate polymer on at least one surface area has a metal content of below 1,000 parts per million.

6. A structure according to claim 1 wherein the crosslinked carbonate polymer surface layer has a thermal stability such that its decomposition temperature as measured by thermogravametric analysis is greater than 350° C.

7. A structure according to claim 1 wherein the substrate layer thermoplastic resin is selected from the group of thermoplastic aromatic carbonate polymers; thermoplastic aromatic polyester carbonates; thermoplastic aromatic polyesters; thermoplastic aliphatic-aromatic polyesters of iso- and/or terephthalic acid; polyvinyl chloride; polyvinylidene chloride; thermoplastic polymers of styrene and/or other monovinylidene aromatic monomers, including their copolymers with maleic anhydride, (meth)acrylates, (meth)acrylonitrile; rubber modified thermoplastic polymers of styrene and/or other monovinylidene aromatic monomers, including their copolymers with maleic anhydride, (meth)acrylates, (meth)acrylonitrile; thermoplastic poly-alpha-olefins comprising polyethylene and polypropylene; thermoplastic poly(meth)acrylates; thermoplastic blends of polystyrene with polyphenylene ether; and blends consisting of two or more of the above-mentioned thermoplastics.

8. A structure according to claim 7 wherein the substrate layer thermoplastic resin is a thermoplastic aromatic polycarbonate or a thermoplastic aromatic polyester carbonate.

9. A structure according to claim 1 wherein the crosslinking is provided by crosslinking moieties terminally located relative to the precrosslinked carbonate polymer molecule chains.

10. A structure according to claim 9 wherein the precrosslinking average degree of polymerization for the carbonate polymers used in preparing a crosslinkable carbonate polymer having terminally located crosslinking moieties is from 0 to about 3.5.

11. A structure according to claim 10 wherein the crosslinking is provided by arylcyclobutene moieties terminally located relative to the precrosslinked carbonate polymer molecule chains.

* * * * *

UNITED STATES PATENT AND TRADEMARK OFFICE
CERTIFICATE OF CORRECTION

PATENT NO. : 5,318,827
DATED : June 7, 1994
INVENTOR(S) : Jane A. Logan, Maurice J. Marks It is certified that error appears in the above-identified patent and that said Letters Patent is hereby corrected as shown below:

On the title page, item [54] and column 1, line 3, "STRUCTURE" should read --STRUCTURES--.

On the title page, under FOREIGN PATENT DOCUMENTS, Item 3, "63.7270641" should read -- 63270641 --.

On the title page, -- Research Disclosure, Polycarbonate overcoats and binders for photoconductive layers and elements, vol. 190, Feb 1980, pp 66 -- should be listed under OTHER DOCUMENTS.

On the title page, -- Bajpai et al., "On the Microhardness of Irradiated Polycarbonate", Makromol. Chem., Macromol. Symp., Vol 20/21, pp. 461-464, 1988 -- should be listed under OTHER DOCUMENTS.

Column 15, line 8, "$v^P$ is greater than" should read -- $v^P$ value is greater than --.

Signed and Sealed this

Twenty-fifth Day of October, 1994

Attest:

BRUCE LEHMAN

*Attesting Officer*     *Commissioner of Patents and Trademarks*